US010060419B2

(12) United States Patent
Rudd et al.

(10) Patent No.: US 10,060,419 B2
(45) Date of Patent: Aug. 28, 2018

(54) BATTERY POWERED VEHICLE PROPULSION SYSTEM

(71) Applicants: Lael Rudd, San Pedro, CA (US); Robert W. Parker, Fountain Valley, CA (US); Edmond K. Tajirian, Rancho Palos Verdes, CA (US)

(72) Inventors: Lael Rudd, San Pedro, CA (US); Robert W. Parker, Fountain Valley, CA (US); Edmond K. Tajirian, Rancho Palos Verdes, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 531 days.

(21) Appl. No.: 14/550,372

(22) Filed: Nov. 21, 2014

(65) Prior Publication Data

US 2016/0146197 A1    May 26, 2016

(51) Int. Cl.
| | | |
|---|---|---|
| *F03H 1/00* | (2006.01) | |
| *B60L 11/18* | (2006.01) | |
| *B60L 15/08* | (2006.01) | |
| *F02K 7/04* | (2006.01) | |
| *B64G 1/40* | (2006.01) | |

(52) U.S. Cl.
CPC ............ *F03H 1/0087* (2013.01); *B60L 11/18* (2013.01); *B60L 15/08* (2013.01); *B64G 1/406* (2013.01); *F02K 7/04* (2013.01); *B60L 2200/10* (2013.01); *Y02T 10/645* (2013.01); *Y02T 10/7005* (2013.01)

(58) Field of Classification Search
CPC ........ F03H 1/00; F03H 1/0087; F03H 1/0093; B60L 11/00; B60L 11/18; B60L 15/08; B60L 2210/10; F02K 7/02; F02K 7/04; Y02T 10/645; Y02T 10/7005
USPC ........................................................ 60/203.1
See application file for complete search history.

(56) References Cited

U.S. PATENT DOCUMENTS

| | | | | |
|---|---|---|---|---|
| 2,585,810 A | * | 2/1952 | Mallinckrodt ............ | F02K 7/04 126/99 R |
| 2,689,887 A | * | 9/1954 | Doehler ................... | H03G 3/22 315/3 |
| 3,151,259 A | * | 9/1964 | Gloersen ................... | F03H 1/00 310/11 |
| 3,280,568 A | * | 10/1966 | Friedman ................. | B64G 1/26 376/318 |
| 4,548,033 A | * | 10/1985 | Cann ...................... | B64G 1/406 313/231.41 |

(Continued)

OTHER PUBLICATIONS

International Preliminary Report on Patentability for corresponding PCT/US2015/052968, dated Jun. 1, 2017 (attached).

(Continued)

*Primary Examiner* — Thai Ba Trieu
*Assistant Examiner* — Loren Edwards
(74) *Attorney, Agent, or Firm* — Tarolli, Sundheim, Covell & Tummino LLP

(57) ABSTRACT

A vehicle propulsion system includes an air heating chamber that receives inlet air from an air intake chamber and provides thrust through an exhaust chamber. A battery powered pulse generator generates a pulsed electrical output signal. An amplifier amplifies the pulsed electrical output signal to provide an amplified pulsed power output signal to the air heating chamber. The amplified pulsed power output signal directly heats the inlet air to generate thrust through the exhaust chamber.

19 Claims, 6 Drawing Sheets

(56) References Cited

U.S. PATENT DOCUMENTS

| | | | |
|---|---|---|---|
| 5,425,231 A * | 6/1995 | Burton | F03H 1/0087 60/203.1 |
| 2003/0200753 A1 | 10/2003 | Eidelman et al. | |
| 2006/0213201 A1 | 9/2006 | Lupkes et al. | |
| 2007/0245712 A1 | 10/2007 | Shimo et al. | |

OTHER PUBLICATIONS

Wang, et al.: "Transient Plasma Ignituion [sic] of Hydrocarbon-Air Mixtures in Pulse Detonation Engines"; A/AA Aerospace Sciences Meeting / A/AA Thermophysics Conference, XX, XX, No. Paper 2004-0834, Jan. 1, 2004, pp. 1-8, XP009138055.

* cited by examiner

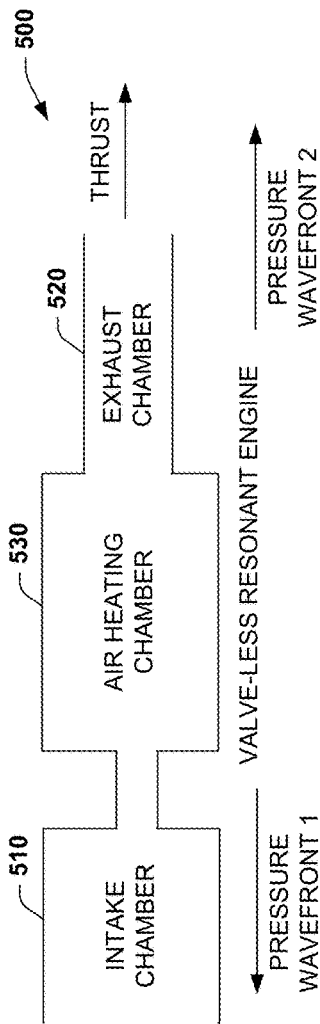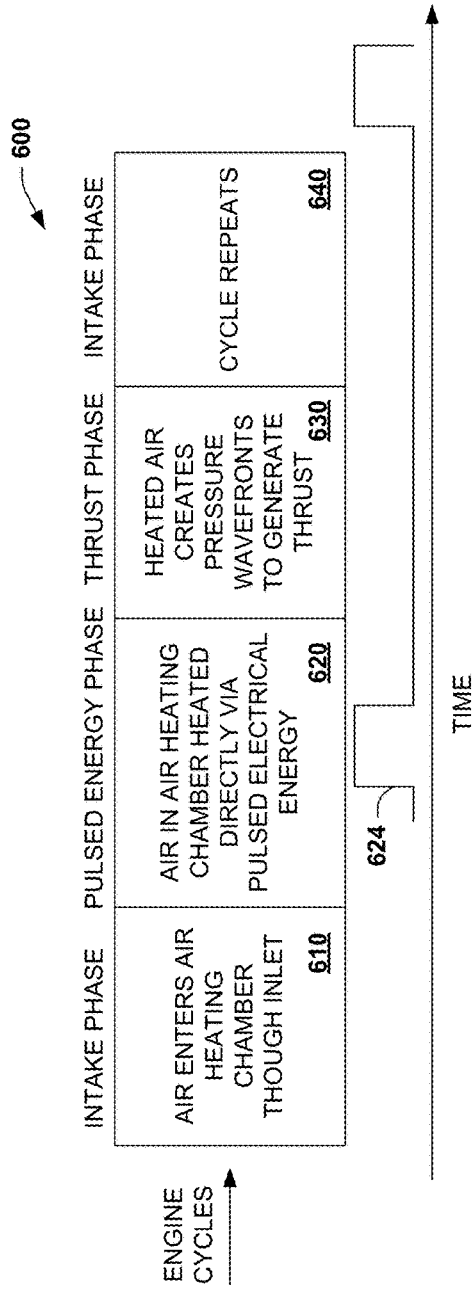

BATTERY POWERED VEHICLE PROPULSION SYSTEM

TECHNICAL FIELD

This disclosure relates to vehicle propulsion systems, and more particularly to a system and method that utilizes pulsed energy from a battery source to generate thrust for a vehicle propulsion system.

BACKGROUND

There are a large number of different types of jet engines, all of which achieve forward thrust from the principle of jet propulsion. Gas turbines are rotary engines that extract energy from a flow of combustion gas. They have an upstream compressor coupled to a downstream turbine with a combustion chamber in-between. In aircraft engines, those three core components are often called the "gas generator." There are many different variations of gas turbines, but they all use a gas generator system of some type. A turbojet engine is a gas turbine engine that works by compressing air with an inlet and a compressor (axial, centrifugal, or both), mixing fuel with the compressed air, burning the mixture in the combustor, and then passing the hot, high pressure air through a turbine and a nozzle. The compressor is powered by the turbine, which extracts energy from the expanding gas passing through it. The engine converts internal energy in the fuel to kinetic energy in the exhaust, producing thrust. All the air ingested by the inlet is passed through the compressor, combustor, and turbine.

Although these and other type jet engines work well for their stated design goals, their respective design configurations do not scale well to smaller and perhaps unmanned situations. For example, compressors and associated jet fuel tanks cannot be efficiently scaled to smaller vehicles. As such, although jet engine technology has enjoyed enormous success for larger aircraft applications, it has not been applied effectively to smaller vehicles.

SUMMARY

This disclosure relates to a system and method that utilizes pulsed energy from a battery source to generate thrust for a vehicle propulsion system. In one aspect, a vehicle propulsion system includes an air heating chamber that receives inlet air from an air intake chamber and provides thrust through an exhaust chamber. A battery powered pulse generator generates a pulsed electrical output signal. An amplifier amplifies the pulsed electrical output signal to provide an amplified pulsed power output signal to the air heating chamber. The amplified pulsed power output signal directly heats the inlet air to generate thrust through the exhaust chamber.

In another aspect, a method includes initiating an air inlet phase to provide inlet air from an air intake chamber to an air heating chamber of a resonant engine. The method includes enabling a battery powered energy pulse to directly heat the air in the air heating chamber during a pulsed energy phase after the air inlet phase. The method also includes disabling the battery powered energy pulse after heating the air in the air heating chamber during a thrust phase to enable thrust to exit through an exhaust chamber of the resonant engine after the pulsed energy phase.

In yet another aspect, resonant engine. The resonant engine a resonant engine includes an intake chamber to receive inlet air for the resonant engine and an air heating chamber to heat the inlet air received from the intake chamber. The resonant engine includes an exhaust chamber to enable thrust to exit the resonant engine after the inlet air is heated in the air heating chamber. The system includes battery powered pulse generator to generate a pulsed electrical output signal. A controller controls a frequency and a duty cycle of the pulsed electrical output signal, where the frequency and duty cycle control a resonant operating cycle for the resonant engine. An amplifier amplifies the pulsed electrical output signal to provide an amplified pulsed power output signal to the air heating chamber. The amplified pulsed power output signal directly heats the inlet air to generate thrust through the exhaust chamber.

BRIEF DESCRIPTION OF THE DRAWINGS

FIG. 5 illustrates an example of a resonant engine that employs pressure wavefronts to control resonant engine operating cycles for the resonant engine.

FIG. 6 illustrates an example phase diagram that illustrates example engine operating cycle phases for the resonant engine depicted in FIG. 5.

DETAILED DESCRIPTION

This disclosure relates to a system and method that utilizes pulsed energy from a battery source to generate thrust for a vehicle propulsion system such as a jet engine, for example. In contrast to propulsion systems that employ liquid hydrocarbon fuel and compressors, the propulsion system as disclosed herein utilizes a combination of chambers forming an engine that operates according to a resonant cycle where air is heated directly via a pulsed electrical source operated by a battery to generate thrust. The chambers of the engine include an air heating chamber that receives inlet air from an air intake chamber and provides thrust through an exhaust chamber. A battery powered pulse generator generates a pulsed electrical output signal. An amplifier amplifies the pulsed electrical output signal to provide an amplified pulsed power output signal to the air heating chamber. The amplified pulsed power output signal is then employed to directly heat the inlet air to generate thrust through the exhaust chamber. By heating air via a pulsed electrical source powered from a battery, smaller scale propulsion systems can be provided which do not employ heavy compressors and associated liquid fuel storage. An example of a smaller, scaled system could include a drone aircraft or a land vehicle, for example.

The engines disclosed herein can be constructed to operate in a resonant manner where various engine cycles are repeated according to the pulsed electrical output signal from the pulse generator. For example, an initial phase of the cycle includes an air intake phase where inlet air is received into the air heating chamber from the air intake chamber. After the air intake phase, a pulse is generated and amplified via the amplifier to heat the air in the air heating chamber during a pulsed energy phase. The amplified pulsed power output signal can power electrodes in the air heating chamber to heat the air in the air heating chamber, for example. After the pulsed energy phase, the resonant cycle includes a thrust phase where the heated air in the air heating chamber is forced out of the air heating chamber through the exhaust chamber to generate engine thrust. In one example, a valve disposed between the intake chamber and the air heating chamber can be employed to enable resonant operations of the engine. The valve closes during the pulsed energy phase and automatically reopens at the end of the thrust phase. In another example, valve-less resonant engines can be employed where the properties of the intake chamber and the exhaust chamber are tuned to create opposing pressure wavefronts to support the resonant cycle. The pressure wavefronts are created during and after the pulsed energy phase to cause more heated air to exit the exhaust chamber than back through the intake chamber and thereby enable thrust to be generated in the engine.

Figure 1:
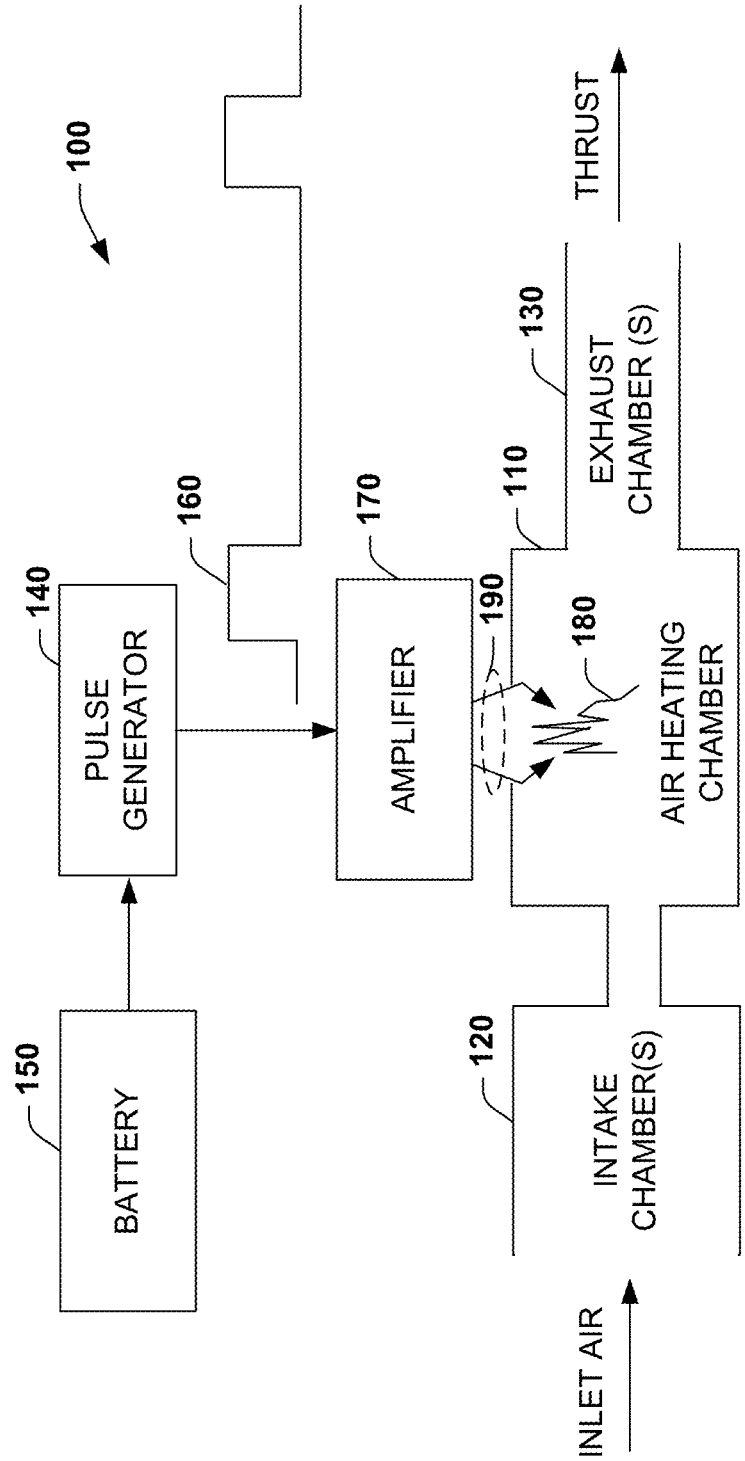
FIG. 1 illustrates an example of a vehicle propulsion system that utilizes a battery powered pulse generator to generate thrust for the system.

FIG. 1 illustrates an example of a vehicle propulsion system 100 that utilizes a battery powered pulse generator to generate thrust for the system. The system 100 includes an air heating chamber 110 that receives inlet air from an air intake chamber 120 and provides thrust through an exhaust chamber 130. The intake chamber 120 and the exhaust chamber 130 can include one or more chambers, respectively, that collectively form the respective intake chamber and exhaust chamber. Also, the air heating chamber 110, the intake chamber 120, and the exhaust chamber 130 can collectively form an engine to provide vehicle propulsion as disclosed herein and illustrated and described below with respect to FIG. 8.

A pulse generator 140 (also referred to as pulsed electrical source) operates from a battery 150 and generates a pulsed electrical output signal 160 having a frequency and duty cycle. The duty cycle is the percentage of one period in which the signal 160 is active (e.g., pulsed high). A period represents the time it takes for the signal 160 to complete an on-and-off cycle (e.g. time between the beginning of one pulse until the beginning of another pulse). The frequency and duty cycle for the signal 160 define one cycle of a resonant operation for an engine collectively formed by the air heating chamber 110, the air intake chamber 120, and the exhaust chamber 130. As used herein, the term resonant operation refers to an engine that operates according to various repeating phases such as an air intake phase, a pulsed energy phase, and a thrust phase, wherein the phases are controlled via the frequency and duty cycle of the signal 160. The various phases for resonant operations will be illustrated and described below with respect to FIGS. 3 though 6. As will be illustrated and described below with respect to FIG. 8, an external or internal controller can be provided to control operations of the pulse generator 140 to dynamically adjust the pulsed electrical output signal 160, if necessary (e.g., if engine loading conditions change).

An amplifier 170 amplifies the pulsed electrical output signal 160 to provide an amplified pulsed power output signal 180 to the air heating chamber 110. The amplified pulsed power output signal 180 is then employed to directly heat the inlet air to generate thrust through the exhaust chamber 130. The air in the air heating chamber 110 can be directly heated by an electrode 190 that is powered by the amplifier 170, for example. By heating air in the air heating chamber 110 via the pulsed electrical source 140 powered from the battery 150, smaller scale propulsion systems 100 can be provided which do not employ heavy compressors and associated liquid fuel storage. An example of a smaller, scaled system could include a drone aircraft or a land vehicle, for example. In contrast to conventional propulsion systems that employ hydrocarbon fuel and compressors, the propulsion system 100 as disclosed herein utilizes a combination of chambers 110, 120, and 130 forming an engine that operates according to a resonant cycle where air is heated directly via the pulsed electrical source 140 operated by the battery 150 to generate thrust. As used herein, the term directly refers to heating air in the air heating chamber 130 without employment of a hydrocarbon fuel source (e.g., jet fuel) that is ignited in the chamber. By pulsing the electrode 190, air (and no other fuel source in the chamber) in the air heating chamber 130 is heated directly via the power that is generated when the electrodes 190 spark to generate the amplified pulsed power output signal 180.

The engines disclosed herein can be constructed to operate in a resonant manner where various engine cycles are repeated according to the pulsed electrical output signal 160 from the pulse generator 140. For example, an initial phase of the cycle includes an air intake phase where inlet air is received into the air heating chamber 110 from the air intake chamber 120. After the air intake phase, a pulse is generated by the pulse generator 140 and amplified via the amplifier 170 to heat the air in the air heating chamber 110 via the electrode 190 during a pulsed energy phase. After the pulsed energy phase, the resonant cycle includes a thrust phase where the heated air in the air heating chamber 110 is forced out of the air heating chamber 110 through the exhaust chamber 130 to generate engine thrust. After the thrust phase, the resonant cycle can repeat with the start of another air intake phase.

In one example (See e.g., FIG. 3), a valve disposed between the intake chamber 120 and the air heating chamber 110 can be employed to enable resonant operations of the engine. The valve closes during the pulsed energy phase and automatically reopens at the end of the thrust phase. In another example, valve-less resonant engines can be employed (See e.g., FIG. 4) where the properties of the intake chamber 120 and the exhaust chamber 130 are tuned to create opposing pressure wavefronts to support the resonant cycle. The pressure wavefronts are created during and after the pulsed energy phase to cause more heated air to exit the exhaust chamber 130 than back through the intake chamber 120 and thereby enable thrust to be generated in the engine.

Figure 2:
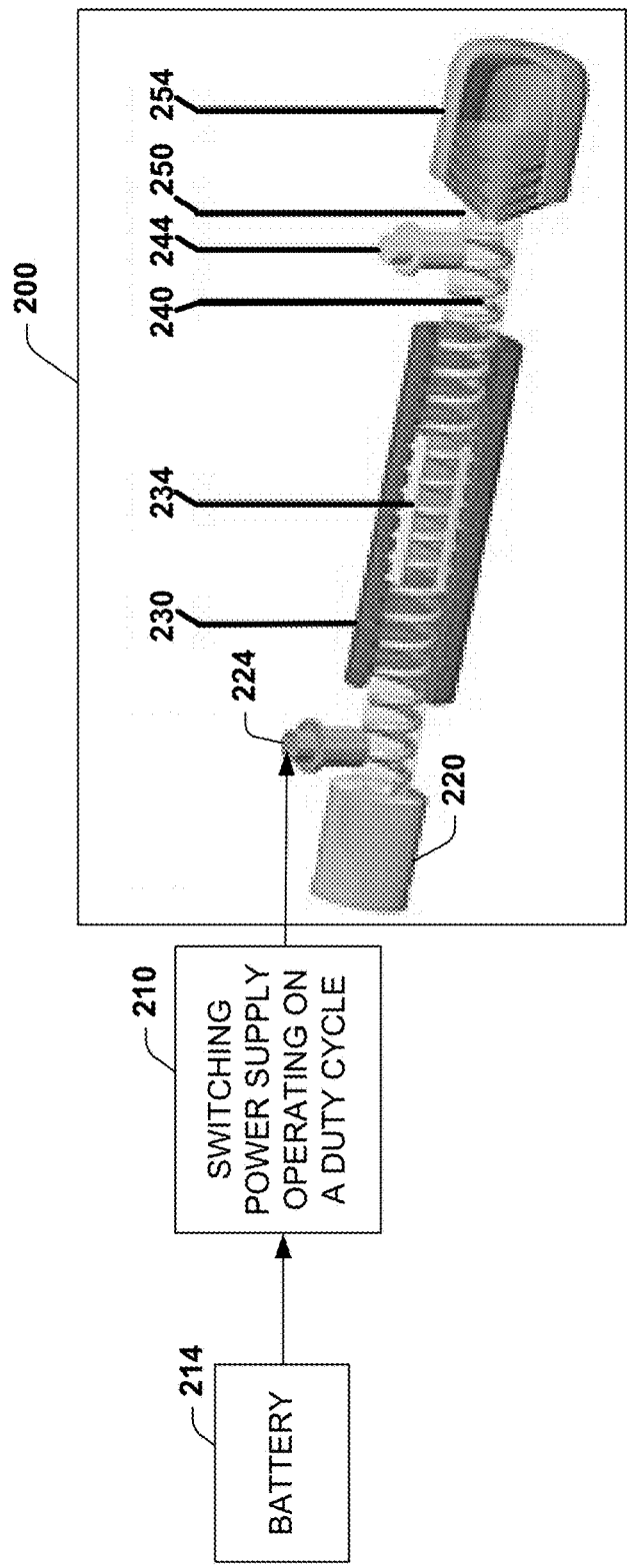
FIG. 2 illustrates an example of an amplifier to amplify pulses generated by a battery powered pulse generator for a vehicle propulsion system.

FIG. 2 illustrates an example of an amplifier 200 to amplify pulses generated by a battery powered pulse generator for a vehicle propulsion system. In this example, a traveling wave tube amplifier (TWTA) 200 is illustrated but other amplifier types are possible. The TWTA 200 is a specialized vacuum tube that is used in electronics to amplify radio frequency signals in the microwave range. The TWTA 200 can be considered in a category of "linear beam" tubes, in which the radio wave is amplified by absorbing power from a beam of electrons as it passes down the tube. In one example, a Helix TWTA as shown in the example 200, allows radio waves to interact with an electron beam while traveling down a wire helix which surrounds the beam. Another example is a coupled cavity TWTA in which the radio wave interacts with the beam in a series of cavity resonators through which the beam passes. Either type TWTA (or other amplifier) can be employed.

The TWTA 200 can be operated via a pulsed source such as a switching power supply 210 operating on a duty cycle in this example. The power supply 210 is powered from a battery 214 and represents the source of power for the engines disclosed herein. The TWTA 200 can include various components. These can include an electron gun 220 and an RF (radio frequency) input 224 to receive output from the power supply 210. The TWTA 200 can include a magnet (or magnets) and an attenuator 234 that wrap a helix coil 240. Output from the TWTA 200 can be received at output node 244 which can be employed to drive electrodes described herein to directly heat air in the air heating chamber such as described above with respect to FIG. 1. The helix coil 240 can be encased in a vacuum tube 250, where the beam within the coil is received by a collector 254.

Figure 3:
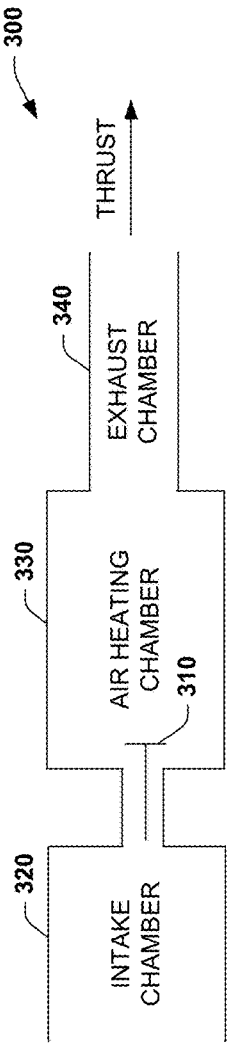
FIG. 3 illustrates an example of a resonant engine that employs a valve to control resonant engine operating cycles for the resonant engine.
Figure 4:
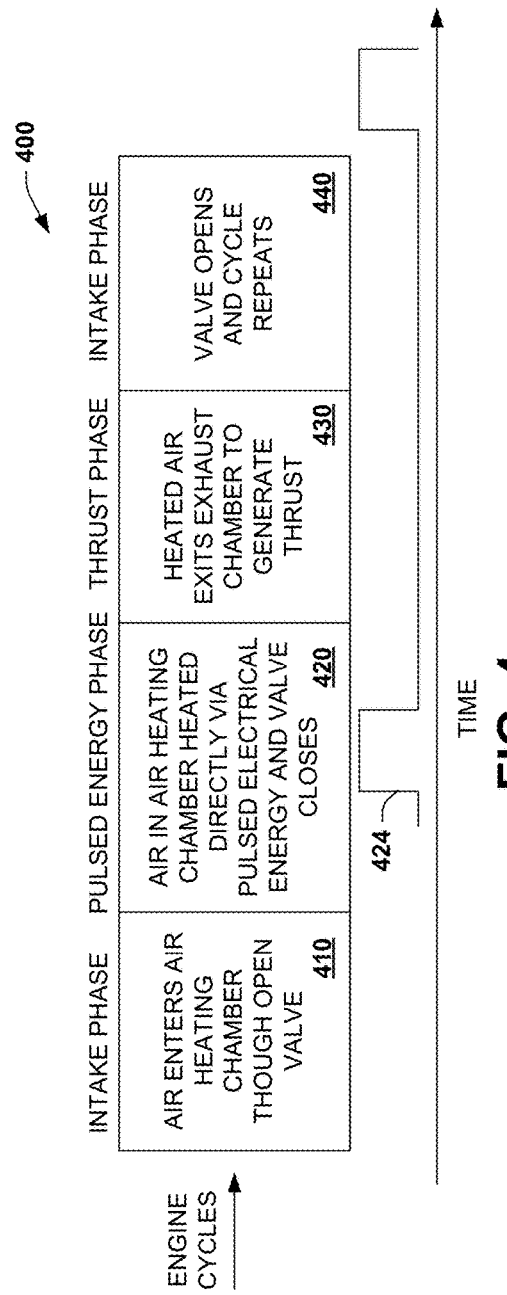
FIG. 4 illustrates an example phase diagram that illustrates example engine operating cycle phases for the resonant engine depicted in FIG. 3.

FIG. 3 illustrates an example of a resonant engine 300 that employs a valve to control resonant engine operating cycles for the resonant engine. In this example, a valve 310 is disposed between an intake chamber 320 and an air heating chamber 330 where thrust exits an exhaust chamber 340. The valve 310 can be employed to enable resonant operations of the engine 300 in accordance with the pulsed electrical signals described herein. Such resonant operations are described with respect to FIG. 4. FIGS. 3 and 4 are described concurrently to illustrate how the resonant operations of FIG. 4 relate to the engine 300 depicted in FIG. 3.

FIG. 4 illustrates an example phase diagram 400 that illustrates example engine operating cycle phases for the resonant engine 300 depicted in FIG. 3. At 410 of FIG. 4, an intake phase for the engine 300 includes air entering the air heating chamber 330 while the valve 310 is open. At 420, a pulsed energy phase includes heating air in the air heating chamber 330 via pulsed electrical energy. A pulse at 424 begins the pulsed energy phase and forces the valve 310 to close. During and after the pulse 424, a thrust phase begins at 430 where thrust is generated and exits the exhaust chamber 340. After a predetermined period of time, defined by the duty cycle of the signal beginning at 424, and at or near the end of the thrust phase 430, the resonant cycle repeats at 440 where the exhaust created by the thrust phase 430 re-opens the valve 310 and begins another intake phase.

FIG. 5 illustrates an example of a resonant engine 500 that employs pressure wavefronts to control resonant engine operating cycles for the resonant engine. In this example, an air intake chamber 510 and an exhaust chamber 520 are tuned such that at least two pressure wavefronts are generated when the amplified pulsed power output signal directly heats the inlet air in an air heating chamber 530. One of the pressure wavefronts exits the exhaust chamber 520 and the other pressure wavefront exits the intake chamber 510 during the thrust phase described below. The tuning of the air intake chamber 510 and the exhaust chamber 520 causes the pressure wavefront exiting the exhaust chamber 520 to be greater than the pressure wavefront exiting the intake chamber 510 to generate the thrust and thus a valve as described above with respect to FIG. 3 is not employed in this example. The pulsed electrical output signal described herein operates according to a frequency and duty cycle to generate the pressure wavefronts and control resonant operations of the engine 500. Such resonant operations are described with respect to FIG. 6. FIGS. 5 and 6 are described concurrently to illustrate how the resonant operations of FIG. 6 relate to the engine 500 depicted in FIG. 5.

FIG. 6 illustrates an example phase diagram that illustrates example engine operating cycle phases for the resonant engine 500 depicted in FIG. 5. At 610 of FIG. 6, an intake phase for the engine 500 includes air entering the air heating chamber 530 via the intake chamber 510. At 620, a pulsed energy phase includes heating air in the air heating chamber 530 via pulsed electrical energy. A pulse at 624 begins the pulsed energy phase 620 to begin creation of the pressure wavefronts described herein. During and after the pulse 624, a thrust phase begins at 630 where thrust is generated via the pressure wavefronts and exits the exhaust chamber 540. After a predetermined period of time, defined by the duty cycle of the signal beginning at 624, the resonant cycle repeats at 640 where another intake phase begins at 640 after the thrust phase 630.

Figure 7:
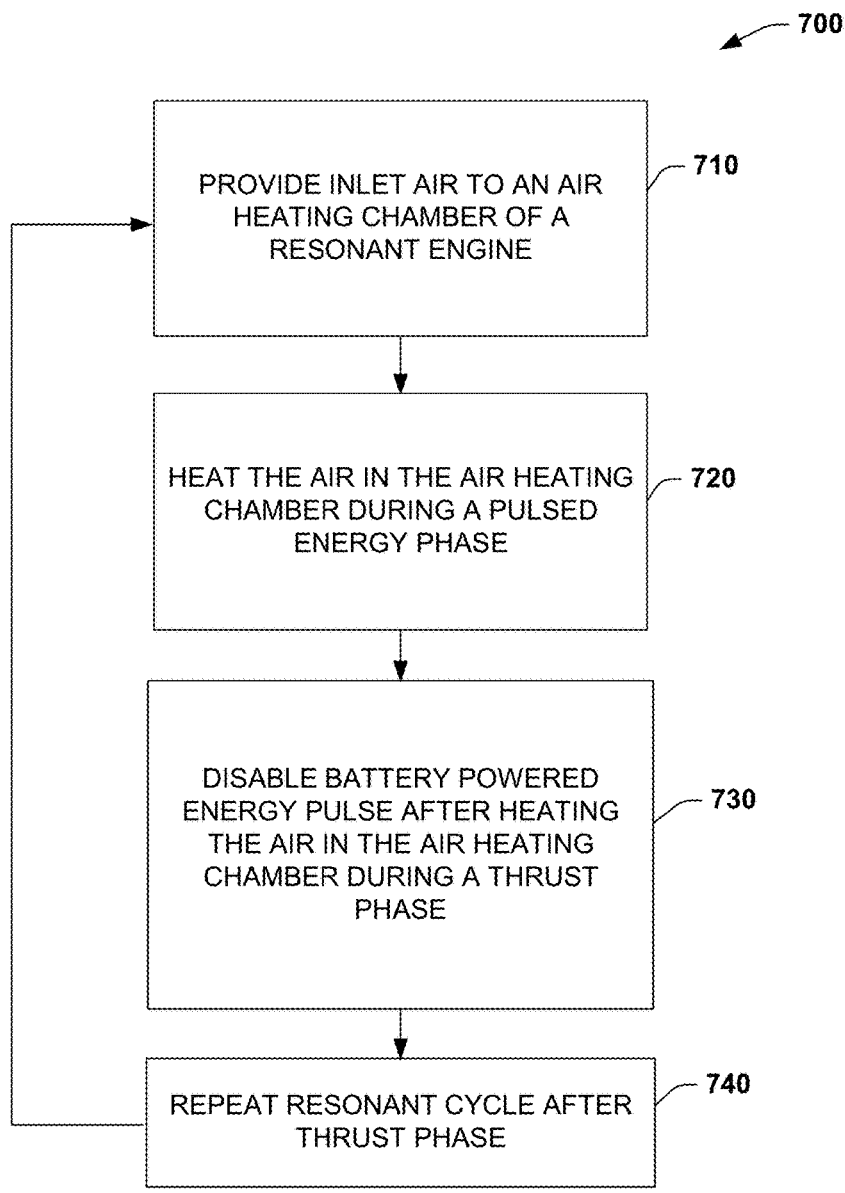
FIG. 7 illustrates an example of a method that utilizes a battery powered pulses to generate thrust for a vehicle propulsion system.

In view of the foregoing structural and functional features described above, a methodology in accordance with various aspects of the present invention will be better appreciated with reference to FIG. 7. While, for purposes of simplicity of explanation, the methodology is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention. The various acts of the method can be executed automatically such as via a processor, computer, and/or controller configured with executable instructions to carry out the various acts or commands described herein.

FIG. 7 illustrates an example of a method 700 that utilizes a battery powered pulses to generate thrust for a vehicle propulsion system. At 710, the method 700 includes initiating an air inlet phase to provide inlet air from an air intake chamber to an air heating chamber of a resonant engine. At 720, the method 700 includes enabling a battery powered energy pulse to directly heat the air in the air heating chamber during a pulsed energy phase after the air inlet phase. At 730, the method includes disabling the battery powered energy pulse after heating the air in the air heating chamber during a thrust phase to enable thrust to exit through an exhaust chamber of the resonant engine after the pulsed energy phase. Although not shown, the method 700 can also include repeating the air inlet phase, the pulsed energy phase, and the thrust phase according to a frequency and duty cycle of the battery powered energy pulse to complete a resonant cycle of phases for the resonant engine.

The method 700 can include closing a valve disposed between the air intake chamber and the air heating chamber during the pulsed energy phase. The valve closes to shut off the inlet air after the battery powered energy pulse heats the inlet air in the air heating chamber. The method 700 includes opening the valve to enable the inlet air to be received by the air inlet chamber a period of time after the thrust exits though the exhaust chamber during the thrust phase. The method 700 can also include generating at least one pressure wavefront in the air intake chamber and at least one other pressure wavefront in the exhaust chamber when the battery powered energy pulse heats the inlet air in the air heating chamber. This can include tuning the air intake chamber and the exhaust chamber such that the at least one pressure wavefront exiting the air intake chamber is less than the at least one other pressure wavefront exiting the exhaust chamber to generate the thrust during the thrust phase.

Figure 8:
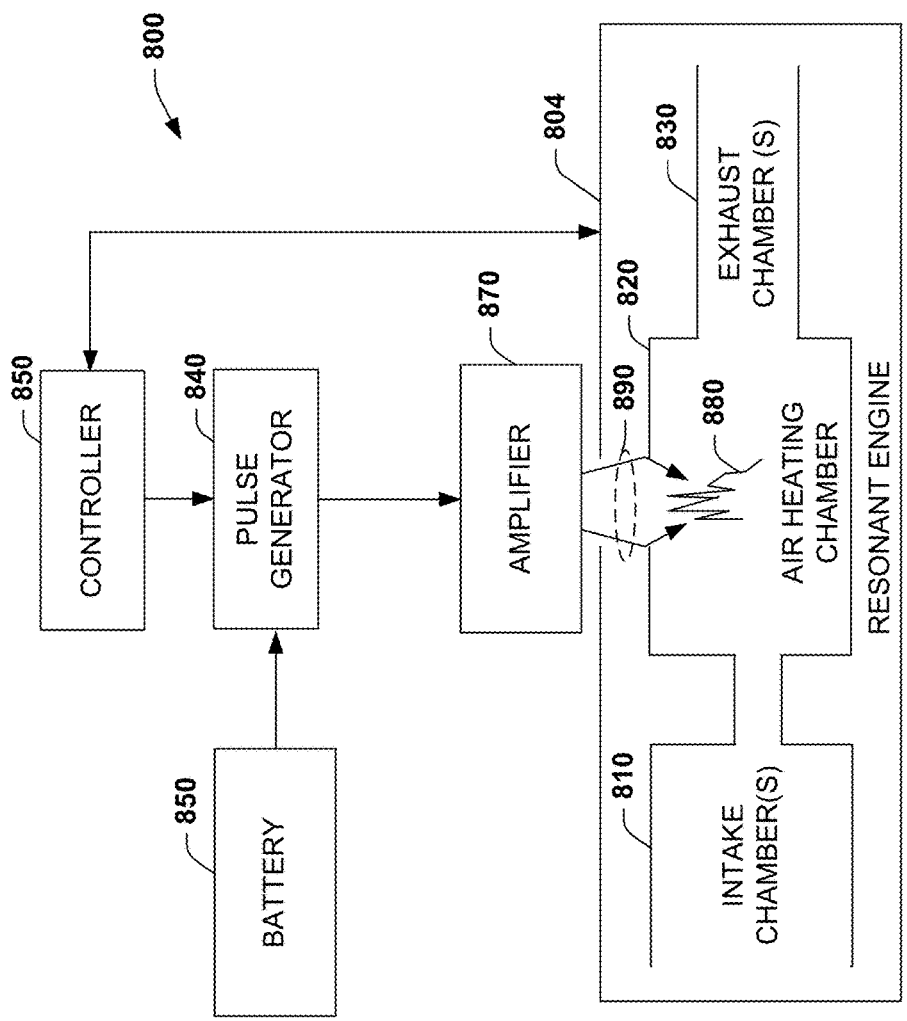
FIG. 8 illustrates an example of a vehicle propulsion system that utilizes a battery powered pulse generator and a controller to generate thrust for the system.

FIG. 8 illustrates an example of a vehicle propulsion system 800 that utilizes a battery powered pulse generator and a controller to generate thrust for the system. The system 800 includes a resonant engine 804 that includes an intake chamber 810 (or chambers) to receive inlet air for the resonant engine. An air heating chamber 820 provides a chamber to heat the inlet air received from the intake chamber 810. An exhaust chamber 830 enables thrust to exit the resonant engine 804 after the inlet air is heated in the air heating chamber 820. A pulse generator 840 is powered from a battery 850 to generate a pulsed electrical output signal (See e.g., FIG. 1). A controller 860 can be employed to control a frequency and a duty cycle of the pulsed electrical output signal from the pulse generator 840, where the frequency and duty cycle control a resonant operating cycle for the resonant engine 804. An amplifier 870 amplifies the pulsed electrical output signal to provide an amplified pulsed power output signal 880 to the air heating chamber 820. The amplified pulsed power output signal 880 can be delivered via electrodes 890 to directly heat the inlet air and to generate thrust through the exhaust chamber 830.

As described above with respect to FIG. 3, a valve can be disposed between the intake chamber 820 and the air heating chamber 820 where the valve closes to shut off the inlet air after the amplified pulsed power output signal 880 heats the inlet air in the air heating chamber. The valve later opens in another phase of the resonant cycle as described herein. In another example such as described above with respect to FIG. 5, the intake chamber 810 and the exhaust chamber 830 can be tuned such that at least two pressure wavefronts are generated when the amplified pulsed power output signal 880 directly heats the inlet air in the air heating chamber.

The controller 860 can be external or internal to the pulse generator 840. The controller 860 can dynamically adjust the frequency and/or duty cycle of the pulsed electrical output signal from the pulse generator 840 based on monitored conditions of the resonant engine 804. For example, if favorable wind conditions were providing additional lift to a drone air craft allowing it to glide, the frequency of the pulse generator could be reduced to conserve power from the battery 850. In other examples, the controller 860 could adjust the frequency and/or duty cycle based on engine loading conditions, for example.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A vehicle propulsion system, comprising:
   an air heating chamber that receives inlet air from an air intake chamber and provides thrust through an exhaust chamber;
   a battery powered pulse generator to generate a pulsed electrical output signal; and
   a traveling wave tube amplifier to amplify the pulsed electrical output signal to provide an amplified pulsed power output signal to the air heating chamber, wherein the amplified pulsed power output signal directly heats the inlet air, without use of a fuel, to generate thrust through exiting of the directly heated inlet air from the exhaust chamber.

2. The system of claim 1, further comprising an electrode that is driven by the traveling wave tube amplifier to provide the pulsed power output signal to the air heating chamber.

3. The system of claim 1, further comprising a valve disposed between the air intake chamber and the air heating chamber, wherein the valve closes to shut off the inlet air after the amplified pulsed power output signal heats the inlet air in the air heating chamber.

4. The system of claim 3, wherein the valve opens to enable the inlet air to be received by the air inlet chamber a period of time after the thrust is generated though the exhaust chamber.

5. The system of claim 4, wherein the battery powered pulse generator generates the pulsed electrical output signal according to a frequency and duty cycle to open and close the valve according to a resonant engine cycle.

6. The system of claim 1, wherein the air intake chamber and the exhaust chamber are tuned such that at least two pressure wavefronts are generated when the amplified pulsed power output signal directly heats the inlet air in the air heating chamber.

7. The system of claim 6, wherein one of the at least two pressure wavefronts exits the exhaust chamber and the other of the at least two pressure wavefronts exits the intake chamber, the tuning of the air intake chamber and the exhaust chamber causes the pressure wavefront exiting the exhaust chamber to be greater than the pressure wavefront exiting the intake chamber to generate the thrust.

8. The system of claim 7, wherein the battery powered pulse generator generates the pulsed electrical output signal according to a frequency and duty cycle to generate the at least two pressure wavefronts.

9. The system of claim 1, wherein the vehicle propulsion system is employed as a jet engine to power a drone air craft or a land vehicle.

10. A method comprising:
    initiating, by a controller, an air inlet phase to provide inlet air from an air intake chamber to an air heating chamber of a resonant engine;
    amplifying, by a traveling wave tube amplifier, a pulsed electrical output signal to provide an amplified pulsed power output signal to the air heating chamber, wherein the amplified pulsed power output signal directly heats the inlet air, without use of a fuel, to generate thrust through exiting of the directly heated inlet air from the exhaust chamber;
    enabling a battery powered energy pulse to directly heat the inlet air, without use of a fuel, in the air heating chamber during a pulsed energy phase after the air inlet phase; and
    disabling the battery powered energy pulse after heating the inlet air in the air heating chamber during a thrust phase to generate the thrust after the pulsed energy phase.

11. The method of claim 10, further comprising repeating the air inlet phase, the pulsed energy phase, and the thrust phase according to a frequency and duty cycle of the battery powered energy pulse to complete a resonant cycle of phases for the resonant engine.

12. The method of claim 10, further comprising closing a valve disposed between the air intake chamber and the air heating chamber during the pulsed energy phase, wherein the valve closes to shut off the inlet air after the battery powered energy pulse heats the inlet air in the air heating chamber.

13. The method of claim 12, further comprising opening the valve to enable the inlet air to be received by the air inlet chamber a period of time after the thrust exits though the exhaust chamber during the thrust phase.

14. The method of claim 10, further comprising generating at least one pressure wavefront in the air intake chamber and at least one other pressure wavefront in the exhaust chamber when the battery powered energy pulse heats the inlet air in the air heating chamber.

15. The method of claim 14, further comprising tuning the air intake chamber and the exhaust chamber such that the at least one pressure wavefront exiting the air intake chamber is less than the at least one other pressure wavefront exiting the exhaust chamber to generate the thrust during the thrust phase.

16. A system comprising:
   a resonant engine comprising:
      an intake chamber to receive inlet air for the resonant engine;
      an air heating chamber to directly heat the inlet air, without use of a fuel, received from the intake chamber; and
      an exhaust chamber to generate thrust through exiting of the directly heated air from the exhaust chamber after the inlet air is heated in the air heating chamber;
   a battery powered pulse generator to generate a pulsed electrical output signal;
   a controller to control a frequency and a duty cycle of the pulsed electrical output signal, wherein the frequency and duty cycle control a resonant operating cycle of the resonant engine; and
   a traveling wave tube amplifier to amplify the pulsed electrical output signal to provide an amplified pulsed power output signal to the air heating chamber, wherein the amplified pulsed power output signal directly heats the inlet air to generate thrust through the exhaust chamber.

17. The system of claim 16, further comprising a valve disposed between the intake chamber and the air heating chamber, wherein the valve closes to shut off the inlet air after the amplified pulsed power output signal heats the inlet air in the air heating chamber.

18. The system of claim 16, wherein the intake chamber and the exhaust chamber are tuned such that at least two pressure wavefronts are generated when the amplified pulsed power output signal directly heats the inlet air in the air heating chamber.

19. The system of claim 16, wherein the controller dynamically adjusts the frequency or duty cycle of the pulsed electrical output signal based on monitored conditions of the resonant engine.

* * * * *